United States Patent [19]

Steger et al.

[11] 3,942,212

[45] Mar. 9, 1976

[54] WINDSHIELD WIPER ASSEMBLY

[76] Inventors: Werner Thomas Steger, 2150 Peartree Road, Mississauga, Ontario; Brian Glynn, 452 Arlington Blvd., Burlington, Ontario; Donald Earl Emmons, R.R. No. 2, Brampton, Ontario, all of Canada

[22] Filed: Jan. 21, 1975

[21] Appl. No.: 542,718

[52] U.S. Cl............................ 15/250.42; 15/250.32
[51] Int. Cl.² ........................................... B60S 1/38
[58] Field of Search ..................... 15/250.32–250.42

[56] References Cited
UNITED STATES PATENTS

| | | | |
|---|---|---|---|
| 2,706,305 | 4/1955 | Oishei............................ | 15/250.42 |
| 3,408,680 | 11/1968 | Heller............................ | 15/250.42 |
| 3,616,485 | 11/1971 | Quinlan et al. ................. | 15/250.42 |
| 3,673,631 | 7/1972 | Yamadai et al.................. | 15/250.42 |
| 3,757,377 | 9/1973 | Hayhurst......................... | 15/250.32 |
| 3,820,188 | 6/1974 | Moorhead et al. .............. | 15/250.42 |
| 3,849,828 | 11/1974 | Cone............................... | 15/250.42 |
| 3,867,737 | 2/1975 | Arman............................. | 15/250.42 |

*Primary Examiner*—Peter Feldman

[57] ABSTRACT

The disclosed windshield wiper assembly includes a squeegee, a backing element operatively connected to the squeegee, and a superstructure which is removably connected to the backing element and adapted to be connected to a windshield wiper arm for urging the squeegee towards the windshield. The superstructure consists of an elongated primary yoke having a pair of spaced free ends; a pair of secondary yokes are respectively pivotally mounted on the free ends of the primary yoke and have pairs of opposed cooperating claws formed thereon for releasably engaging the backing element. The primary and secondary yokes each have a generally triangularly shaped transverse cross section, through substantially their entire length, defined by a pair of inclined longitudinally extending side surfaces and a substantially flat base which extends parallel to and in spaced relation from the backing element. The side surfaces of the primary and secondary yokes present inclined pressure surfaces to an air stream moving over the surface to be wiped whereby downward components of force are produced on the yokes to increase the downward pressure on the squeegee. The backing element includes specially formed embossments located outwardly of the superstructure to provide stops for engagement with generally complementary shaped portions of the claws on the secondary yokes to prevent inadvertent removal of the backing member and squeegee from the superstructure.

16 Claims, 11 Drawing Figures

FIG. 1

WINDSHIELD WIPER ASSEMBLY

The present invention relates to windshield wiper assemblies and, more particularly, to an assembly which is adapted to wipe flat or curved surfaces with a reduced tendency to lift from the windshield under the effect of air flow.

With the use of windshields having relatively complex curvatures in modern motor vehicles, the problems in insuring that the windshield wiper assemblies used therewith evenly wipe over the full wiping area of the assembly have substantially increased. Two principal problem areas in maintaining uniform wiping by the assembly are the tendency of the assembly to lift off of the windshield under wind loads generated by natural atmospheric head winds or by forward movement of the windshield as well as the need to maintain a uniform wiping pressure on the squeegee element of the assembly along its entire length, despite the different curvature of different portions of the element against the curved windshield due to changes in the curvature of the element as it moves over the windshield.

In order to maintain uniform wiping pressure on the squeegee of the windshield wiper assembly, various types of superstructure arrangements have been previously proposed that use a plurality of subsidiary or secondary yokes to distribute pressure from the wiper arm of the motor vehicle along the entire length of the squeegee. These assemblies typically utilize a squeegee support or backing member, between the superstructure and the squeegee, which consists of a body portion of greater width than depth so as to have less flexibility in directions parallel to the surface to be wiped than it does in directions perpendicular to the surface to be wiped. Several of such previously proposed superstructure and backing element arrangements are disclosed and discussed in U.S. Pat. No. 3,408,680.

In addition, in order to counteract the wind lift effect on wiper assemblies during operation, various cross sectional configurations have been proposed for the primary yoke of the assembly; one such structure is shown in U.S. Pat. No. 3,317,946.

It is an object of the present invention to provide an improved windshield wiper assembly which applies a uniform pressure to the squeegee element in order to insure uniform wiping of the windshields.

Another object of the present invention is to provide a windshield wiper assembly which has improved characteristics for resisting wind lift.

Another object of the present invention is to provide an improved squeegee support for use in a windshield wiper assembly.

Another object of the present invention is to provide a windshield wiper assembly having relatively simple means for securing and detaching a squeegee to the pressure applying superstructure.

Yet another object of the present invention is to provide a windshield wiper assembly and clip structure for conveniently securing the assembly to the wiper arm of the motor vehicle.

A further object of the present invention is to provide an efficient windshield wiper assembly which can accommodate a variety of different shaped windshield curvatures while resisting wind lift during operation.

A still further object of the present invention is to provide a windshield wiper blade assembly which is relatively simple and inexpensive to manufacture and is durable in use.

The above, and other objects, features and advantages of the invention will be apparent in the following detailed description of an illustrative embodiment thereof, which is to be read in connection with the accompanying drawings, wherein.

Figure 1:
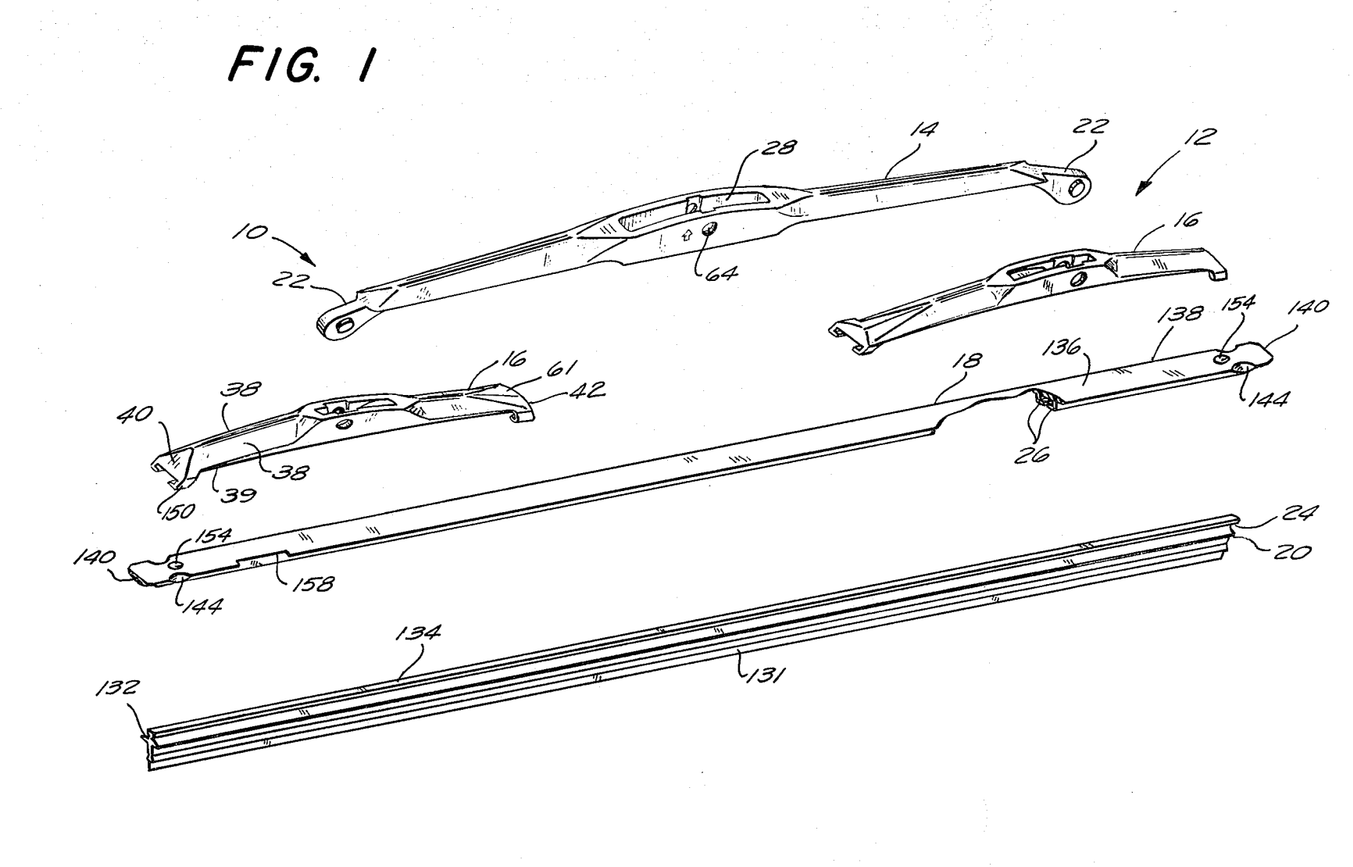
FIG. 1 is an exploded perspective view of a windshield wiper assembly constructed in accordance with the present invention.
Figure 2:
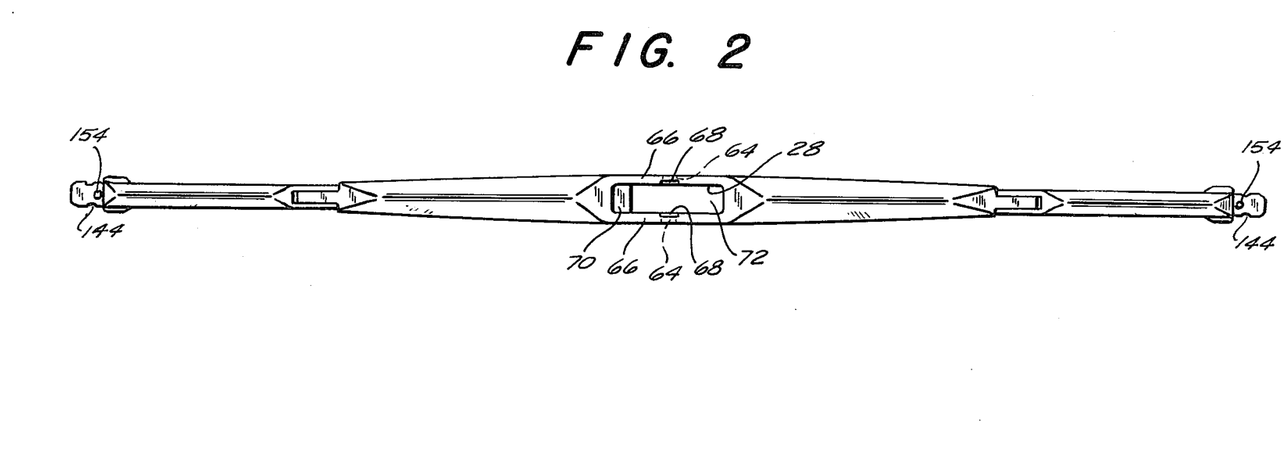
FIG. 2 is a plan view of the windshield wiper assembly shown in FIG. 1.
Figure 3:
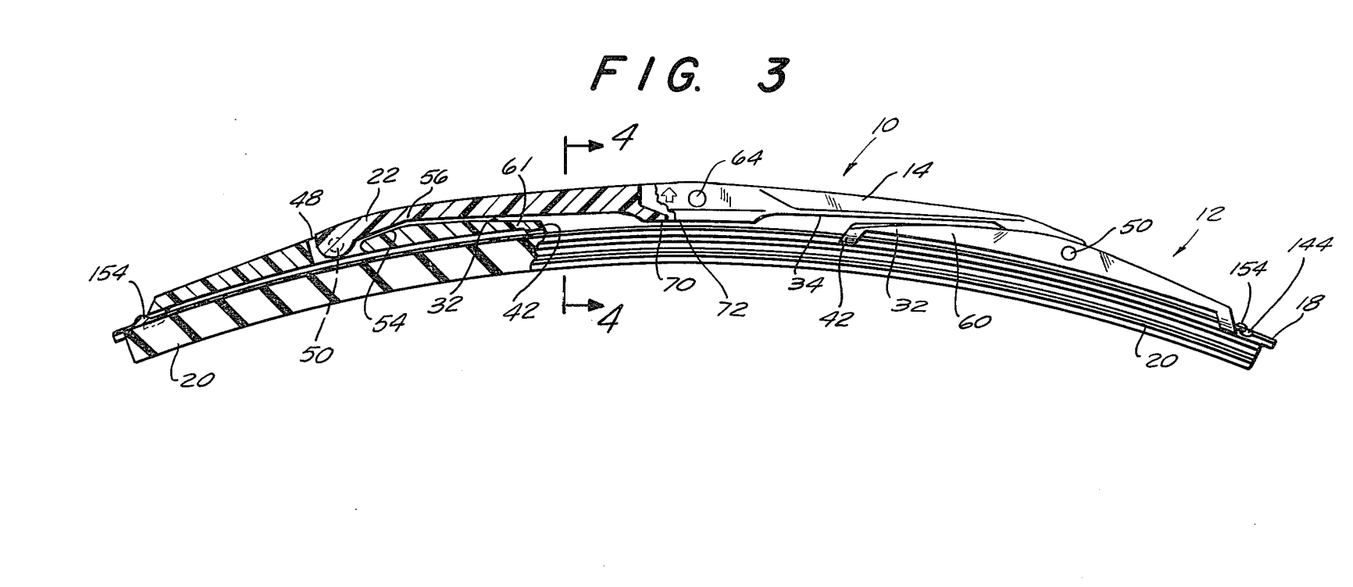
FIG. 3 is an elevational view, partly in section, of the windshield wiper assembly of FIG. 2.

Referring now to the drawing in detail, and initially to FIGS. 1–3 thereof, it will be seen that a windshield wiper assembly 10, constructed in accordance with the present invention, includes a superstructure 12 consisting of a primary yoke 14 and a pair of secondary yokes 16, as well as a squeegee backing element or support 18 and a squeegee 20. The secondary yokes 16 are pivotally secured to the ends 22 of the primary yoke 14, as described hereinafter, to distribute pressure from the wiper arm, to which the primary yoke is connected, along the backing element 18. The squeegee 20 is retained in the backing element 18 with its thin neck portion 24 received between the flanges or ribs 26 formed on the lower side of the backing element.

Each of the elements of superstructure 12 is formed of a hard plastic material, such as a polycarbonate or other synthetic plastic material having the desired characteristics, which can be mixed with different coloring materials and surface texture producing materials in order to avoid glare and to provide color matching with the remainder of the automobile on which it is to be used.

The primary yoke or primary superstructure 14 is slightly bowed or curved in its exterior configuration so as to be concave towards the surface to be wiped. Approximately at the mid-point along the length of the primary superstructure an opening 28 is provided through which, as described hereinafter, the superstructure is connected to the free end of a wiper arm (not shown), by the aid of an intermediary clip, so that the assembly will be spring urged in the direction generally perpendicularly towards the windshield, and is moved over the windshield in directions parallel thereto.

Movement of any windshield wiper assembly along the windshield during operation normally produces a wind lift on the assembly, as does the natural air flow across the assembly due to forward movement of the vehicle. In order to counteract this wind lift, the primary superstructure of the present invention has been formed with a generally triangularly shaped cross section, as seen most clearly in FIG. 4. By this cross section a pair of opposed inclined sides 30 are provided which diverge downwardly and outwardly from a slightly arcuate apex 32. The opposite or lower ends of the sides 30 are connected by a flat base portion 34 which provides a solid surface between the inclined surfaces 30. This base is located generally parallel to, and in spaced relation from, the upper surface 36 of the squeegee backing element 18.

Figure 4:
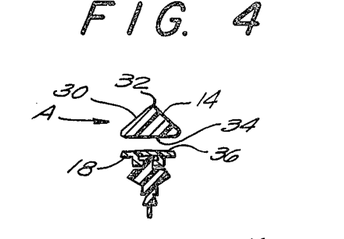
FIG. 4 is a sectional view taken along line 4—4 in FIG. 3.

As this wiper assembly is in movement, the wind forces caused by such movement, and by the natural flow of air across the windshield, will engage one of the inclined surfaces 30, facing the direction of movement of the assembly, as indicated by the arrow A in FIG. 4, and will be deflected upwardly therefrom. The action of the wind force against the inclined surface 30 thus will produce a downward force on the primary superstructure 14 which will resist any tendency of the assembly to lift under the influence of the air flow. It has been found that for optimum resistance to lift off, the apex 32 between sides 30 should have a radius of curvature of one-sixteenth of an inch or less.

The action of the air flow over the assembly is aided by the flat surface 34 provided in the triangular cross-section of the superstructure. This flat surface provides a relatively smooth passage for air flow between the superstructure and the backing element 18 so that the air will pass therethrough with little or no turbulence. Thus, no upward or lifting forces are applied to the superstructure by the air passing between the superstructure and the backing element 18. Accordingly, the configuration of the superstructure not only causes the air flow to produce a downward force acting against lift off, but also reduces the creation of turbulent air which would produce lift off.

In order to further reduce and resist the tendency of the assembly to lift off from the windshield on which it is used, the secondary superstructures or yokes 16 are also formed with a generally triangularly shaped cross section substantially throughout their entire length. This cross section is similar to the cross section of the primary superstructure and includes a pair of oppositely inclined surfaces 38 and a substantially flat base portion 39. These surfaces act in the same manner as the surfaces 30, 34 described above, in order to produce a downward force on the backing element 18 and to reduce air turbulence which would tend to cause lift off.

The secondary superstructures 16 are connected to the primary superstructure 14 by a pivotal connection intermediate their inner and outer ends 40, 42 respectively. This connection is provided by a central generally rectangular opening 44 formed in a central portion of the secondary yokes and defined between a pair of side walls 46 of the yokes. A pair of transverse bores 48 are formed in the walls 46 and are adapted to receive pivot pins 50 integrally formed on the free ends 22 of the primary yoke. Preferably, the inner surfaces of the side walls 46 have cutout ramps 52 formed therein which are inclined from the top surface of the secondary yokes towards the openings or bores 48 in order to form inwardly inclined cam and guide surfaces for guiding the pins 50 into the bores 48.

As seen most clearly in FIG. 3, the openings 44 have a configuration which is generally complementary to the peripheral configuration of the free ends 22 of the primary yoke 14. In particular, the openings 44 each include a bottom ramp portion 54 which is generally complementary to the inclined bottom surface 56 of its associated free end 22 of the primary yoke. In addition, the ends 22 of the primary superstructures 14 are inclined and tapered downwardly, as seen in FIGS. 1 and 3, so that the extreme free ends thereof adjacent the pivot pins 50 are substantially completely received within the openings 48. In this manner an extremely compact pivot arrangement and superstructure assembly is provided.

In FIG. 3, the relative positions of the various superstructure elements with respect to one another are shown in the extreme position of curvature for the wiper or squeegee element 20. In that position the top surface, or apices 32, of the primary superstructure 14 and apices of the portions of the secondary superstructures beyond the free ends 22 are in substantial alignment and form a substantially smooth curved surface. By this arrangement, the inclined surfaces 38 of the secondary superstructures form a continuation of the inclined surfaces of the primary superstructure and provide increased downward forces holding the wiper element against the surface to be wiped.

In order to increase the amount of curvature permitted in the squeegee element, to allow the squeegee to accommodate windshields of optimum curvatures, the inner portions 60 of the secondary superstructures, below the primary superstructure, are tapered from the pivot 50 to the inner ends 42 thereof. That is, the height of the triangular cross section decreases at points further away from the pivot 50 so that, adjacent the free ends 42 of the secondarys, the cross section of the secondary superstructures is that of an extremely flat triangle. At the extreme end sections 61 the cross section is almost rectangular.

By this arrangement, as seen in FIG. 3, the top surface or apices 32 of the inner end portions 60 of the secondary superstructures are positioned parallel to and adjacent the bottom surface 34 of the primary superstructure in an extremely compact configuration, to allow maximum curvature of the squeegee.

The inclined surfaces 38 of the inner portion 60 of the secondary superstructures form a further continuation of the inclined surfaces 30 of the primary superstructures and also serve to produce a downward force on the backing element 18 of the assembly in order to resist wind lift forces.

As mentioned above, the primary superstructure 14 is connected to the normal spring urged wiper arm of the motor vehicle by a pivot or clip arrangement mounted in the upper rectangular opening 28 formed at the central portion of the primary superstructure. This rectangular opening is adapted to receive any of a plurality of clips, shown for example in FIGS. 8–12, which are adapted to accommodate wiper arms of varying configurations depending upon the type of motor vehicle with which the assembly is used. Each of the clips, as described more fully hereinafter, has a pair of outwardly extending pivot pins 62 (see FIG. 8) formed integrally therewith which are adapted to be received in transverse bores 64 formed through the side walls 66 of the primary superstructure which define the sides of the opening 28. The side walls 66 include ramp sections 68 which incline downwardly and inwardly from the top surface of the primary superstructure towards the bores 64 to act as guide and cam surfaces for the pins 62 which then snap into place in the bores 64.

This arrangement for mounting the connecting clips in the primary superstructure has the advantage that the pivot connection is substantially stronger than previously proposed saddle type clip structures wherein the clip has a pair of flanges which overlie the primary superstructure. The overlying flanges of these previously proposed clips can be readily spread by wind forces or manual contact during replacement of the squeegee element. With the present invention on the other hand, the opening 20 is fully enclosed and the side walls 66 are supported against lateral movement by their integral correction with the remainder of the superstructure. Thus a more positive and permanent connection is provided between the superstructure and the clip. In addition the single superstructure 14 can accommodate a variety of shaped clips to facilitate connection of the assembly to different types of wiper arms.

In order to further rigidify the boxlike openings 28, in order to prevent inadvertent removal of the connecting clip structure from the wiper assembly superstructure, the base of the opening can be provided with a transverse wall portion 70 which reinforces the walls 66. This aids in preventing the walls 66 from being spread apart.

It is noted that the opening 72 through the base 34 of the superstructure 14 need only be large enough to accommodate the largest size clip to be used with the superstructure. Thus the opening 28 need not be cut entirely through the superstructure.

Figures 7, 8:
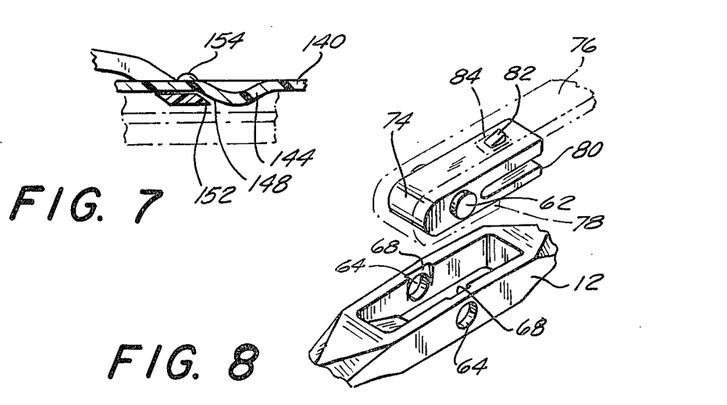
FIG. 7 is a sectional view taken along line 7—7 in FIG. 5.
FIG. 8 is a perspective view of a clip structure used to connect the wiper arm of the motor vehicle to the superstructure of the wiper assembly.

The clip 74 shown in FIG. 8, is adapted to be used with a conventional wiper arm 76 having a J bend 78 formed at the end thereof. The clip is formed as an integral molded plastic element having a pair of flanges 80 which resiliently engage the opposite sides of the J bend 78 to frictionally hold the clip in the wiper arm. In addition, the clip can be provided with a raised boss 82 adapted to be received in a complementary opening 84 formed in the wiper arm to positively retain the clip against longitudinal movement therein. With the clip mounted in the wiper arm 76, as shown in FIG. 8, the assembly 12 can then be moved toward the clip with the pin 62 inserted along the ramps 68 of the assembly into the opening 64.

Figure 9:
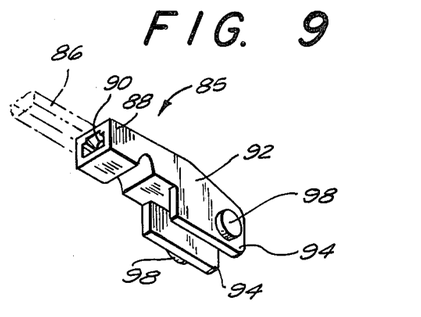
FIGS. 9-11 are perspective views, similar to FIG. 8, of other clip arrangements.

The clip 85 illustrated in FIG. 9 is adapted to be used with a conventional bayonet type wiper arm 86 and has a channel 88 formed in one end thereof which receives the free end of the wiper arm. The upper surface of the channel has an opening 90 formed therein which snap fits with the conventional boss formed on the ends of such bayonet type arms.

The forward end 92 of the clip 85 is provided with a pair of flanges 94 which are adapted to be inserted in the opening 28 of the primary yoke 14. Each of the flanges 94 includes an outwardly extending pivot pin 98 which snap fit into the bores 64. It is noted that by this arrangement the plastic flanges 94 of the clip 85 provide an outward bias for urging the pins 98 into positive engagement in the bores 64.

Figure 10:
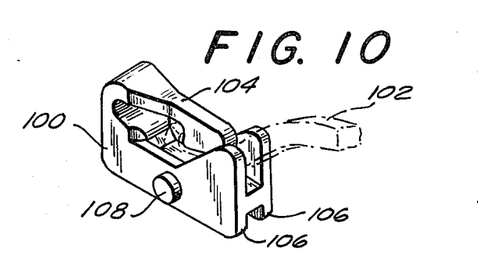

The clip 100 illustrated in FIG. 10 is adapted to be used with a wrist action type wiper arm 102 of conventional construction. This clip is similar in construction to the clip illustrated in U.S. Pat. No. 3,146,508 in that it includes a resilient keeper latch 104 which cooperates with a stud or boss formed on the free end of the wiper arm. In addition however the clip includes a pair of side flanges 106 on which outwardly extending pins 108 are formed. These pins are inserted in the bores 64 of the superstructure 14, and the outward resilient bias of the flanges 106 provide a positive engagement therebetween.

Figure 11:
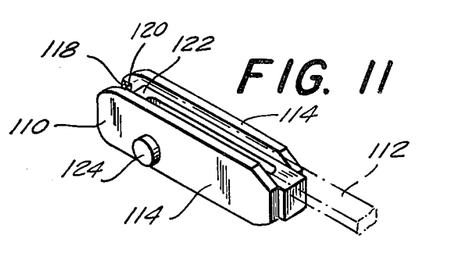

The clip 110 shown in FIG. 11 is adapted to be used with a J bend type wiper arm 112 having a narrower width than the wiper arm 76 shown in FIG. 8. This clip has a pair of side flanges 114 interconnected by a cross piece 116, which flanges receive the wiper arm 112 therebetween. The free ends 118 of the flanges 114 include studs or projections 120 which snap fit over the curved end 122 of the wiper arm to retain the wiper arm against longitudinal movement. In addition, the flanges 114 include outwardly projecting pins 124 which are adapted to be snap fit into the recesses or bores 64 in the primary yoke. These flanges also bias the pins outwardly to apply a positive pressure holding pins 124 in bores 64.

Figure 5:
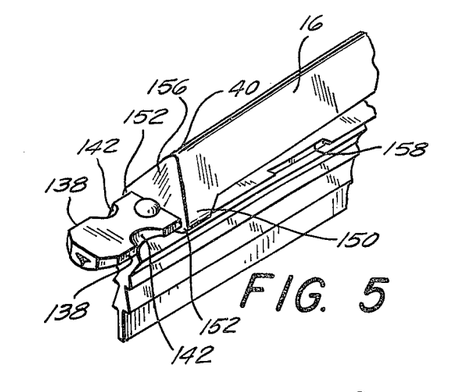
FIG. 5 is a top perspective view of one end portion of the windshield wiper assembly of FIG. 3 showing the connection of the backing element for the squeegee to the secondary yoke of the assembly.
Figure 6:
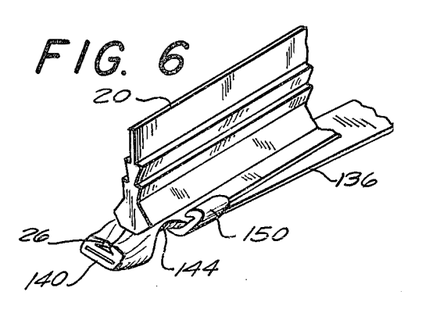
FIG. 6 is a bottom perspective view of the end of the assembly showing FIG. 5.

Referring again to FIG. 1, and to FIGS. 5–7, it will be seen that the squeegee element 20 is formed from a soft elastomer material and comprises a wiping portion 130, which can be made of any suitable cross section, joined by a thin neck 132 to a retention portion 134 of slightly larger cross section. The backing element 18, which is preferably formed by an extrusion process, from any suitable synthetic plastic material having the desired physical properties, has a main body portion 136 which is of substantially greater width in the direction parallel to the surface to be wiped than is its depth in the direction perpendicular to that surface.

The two flanges 26 are upstanding from the lower surface of body portion 136 and are spaced from one another, as seen in FIG. 1, inwardly of the edges 138 of body 136 and receive therebetween the neck portion 132 of the squeegee. The flanges 26 form a channel which retains the portion 134 of the squeegee; the latter has a cross section such that it is easily slidably fit into the channel. By this arrangement the squeegee is able to slide freely in the channel, without excessive sideplay, in order to obtain uniform wiping. It is believed that the sliding ability of the squeegee is important in reducing the tendency of the squeegee element to buckle in directions parallel to the surface being wiped as its perpendicular curvature changes in moving over a complex curved windshield surface. For the same reason, the channel formed by the flanges 26 is made slightly longer than the squeegee element so that the latter is capable of corresponding end wise movement therein.

Preferably the squeegee is placed in the channel between flanges 26 when the ends 140 of the backing element are open and undeformed. After the squeegee is inserted, the ends of the backing element are cold formed so that the backing element has the configuration illustrated in FIGS. 1 and 6. As seen therein, the free ends 140 of the backing element are crimped so that the flanges 26 are folded over upon themselves to close the end of the channel defined therebetween, thereby preventing withdrawal of the squeegee 20 from the backing element. In addition, the edges 138 of the backing element are crimped or cold formed with semi-circular depressions 142 on opposite sides thereof, with the cold formed material extending downwardly below the lower surface of the body portion 136 of the backing elements (see FIGS. 6 and 7). By this arrangement, the depressed portion 144 of the semi-circular depression 142 forms an inclined and slightly curved surface 148. This surface provides a stop for the claws 150 formed on the free ends of the secondary superstructures 16.

Claws 150 are provided with inclined outer surfaces 152 whose inclination is generally complementary to the inclined configuration of surface 148. The engagement of the surfaces 152 and 148 will provide a stopping action preventing withdrawal of the free end 140 of the backing element through the claws 50 of the secondary superstructure elements 16. By this arrangement, a relatively broad contact area is provided between these two surfaces so that stresses applied to the surfaces 148 of the backing element do not cold work or deform those surfaces, thereby increasing the useful life of the backing element and squeegee assembly.

In addition, in order to further insure against movement of the free end portion of the backing element inwardly through the claws 150 of the superstructure elements 16, the backing element when cold formed is also provided with a dimple or embossment 154 on its upper surface which engages the front wall 156 at the outer end 40 of the secondary superstructures 16, where it bridges the front faces 152 of the claws 150.

In order to allow insertion of the backing element 18 between the claws of the secondary superstructure elements, the backing element is provided with a notch 158 along one of its edges 138. This notch is formed by striking, cutting or punching the edge of the backing element at a location which can only be reached by the immediately adjacent endmost pair of claws 150 when the superstructure is deflected very much beyond the extent that could possibly be met in normal operation, i.e. beyond the curved configuration illustrated in FIG. 3.

When inserting the backing element 18 in the superstructure assembly, the notch 158 is first placed adjacent one of the outermost pairs of claws 150, e.g. the pair of claws 150 adjacent the right hand end of the superstructure as shown in FIG. 1, and the backing element is tilted so that the unnotched edge 138 thereof is inserted between the claws. The notch 158 permits the other claw to pass therethrough, and upon sliding of the backing element towards the left, both claws will be retained about the edges 138 of the backing element. When the next pair of claws adjacent the inner end 142 of the right secondary superstructure 16 is reached, the left end 140 of the backing element is twisted, to again insert the unnotched edge of the backing element into one of the claws so that the opposite claw of the pair can then pass through the notch 158. The backing element is then slid to the next pair of claws and the operation is repeated until all of the claws are positioned about the backing element. In the final position of the backing element, as illustrated in FIG. 5, the notch 158 is located rearwardly of the claws 150 so that the claws cannot be inadvertently withdrawn therefrom.

When it is desired to replace the backing element and squeegee arrangement, the superstructure is bent sufficiently to position the notch 158 in registry with the left end claws 150. The backing element can then be twisted to release the claws through the notch 158. The backing element is then slid to the right (in FIG. 1) and the twisting of the backing element at each pair of claws is repeated. This operation is described in detail in the above mentioned U.S. Pat. No. 3,408,680.

Accordingly, it will be seen that an improved windshield wiper assembly has been provided which will substantially reduce the effects of wind lift forces. Moreover, the arrangement, being formed entirely of plastic, produces a much lighter wiper unit which reduces inertial loads on the windshield wiper drive mechanism. The absence of metal parts also reduces the noise level of operation and avoids the problem of corrosion and deterioration due to weather, road salt, and other corroding materials. As yet another feature of the invention an improved backing element for the wiper blade is provided which resists inadvertent removal of the backing element from the superstructure assembly and reduces stresses produced therein by contact with claws of the superstructure. Moreover, a more compact arrangement is provided which reduces the required height for the assembly in order to accommodate maximum curvature in a windshield.

Although an illustrative embodiment of the present invention has been described herein with reference to the accompanying drawing, it is to be understood that the invention is not limited to that precise embodiment, and that various changes and modifications may be effected therein by one skilled in the art without departing from the scope or spirit of this invention.

What is claimed is:

1. A windshield wiper assembly comprising an elongated squeegee formed of a flexible material; a backing element operatively connected to the squeegee and extending lengthwise thereof; and a superstructure removably connected to said backing element and adapted to be connected to a windshield wiper arm for urging the squeegee towards the windshield; said superstructure comprising an elongated primary yoke having a pair of spaced opposite free ends and a pair of secondary yokes respectively pivotally mounted on the free ends of said primary yoke; said secondary yokes including means for releasably engaging said backing element; said primary yoke having a generally triangularly shaped transverse cross section through substantially its entire length defined by a pair of inclined longitudinally extending side surfaces and a substantially flat base which extends parallel to and in spaced relation from the backing element; said inclined side surfaces defining an apex therebetween located generally along the longitudinal axis of the primary yoke and flare outwardly therefrom; said secondary yokes each having a similar triangularly shaped transverse cross section through substantially their entire length defined by outwardly flaring side surfaces and a substantially flat base; said side surfaces of the primary and secondary yokes presenting inclined pressure surfaces to an air stream, moving over the surface to be wiped, whereby downward components of force are produced on the primary and secondary yokes which increases the downward pressure of the squeegee on the windshield and resists windlift effects on the assembly; said flat base of the primary and secondary yokes providing a smooth channel between the yokes and the backing elements to minimize windlift producing turbulence of air passing through the assembly.

2. The assembly as defined in claim 1 wherein said secondary yokes have inner and outer end portions and are mounted on said primary yoke with their inner end portions facing each other below the base of the primary yoke and the outer end portions thereof extending beyond the free ends of the primary yoke; and wherein the cross-section of said inner end portions of the secondary yokes tapers from a maximum height adjacent their pivotal connection to the primary yoke to a minimum height adjacent the extreme free end thereof where the cross-section becomes almost flat, whereby the secondary yokes can pivot on the primary yokes to an extreme position wherein the extreme free ends of their inner end portions are adjacent the base of the primary yoke thereby to allow the squeegee to flex to a minimum extent in order to accommodate an extreme curvature in the windshield while simultaneously supporting and applying pressure to the squeegee in that position.

3. The assembly as defined in claim 2 wherein said secondary yokes each have an opening formed therein between said inner and outer end portions; said free ends of said primary yoke being inserted in said openings and including means for pivotally connecting the ends of the primary yoke in the openings of the secondary yokes.

4. The assembly as defined in claim 3 wherein said free ends of said primary yoke comprise downwardly inclined extensions of the primary yoke having a smooth upper surface forming a substantially continuous curved extension of the apex of the primary yoke; the inclination of said extensions being selected such that said smooth upper surface is in longitudinal alignment with the apex of the outer end portions of the secondary yokes when the secondary yokes are in their extreme position whereby the assembly has a substantially continuous curved profile configuration along its upper surface with the inclined surfaces of the primary and outer portions of the secondary yokes in alignment to provide a substantially continuous inclined pressure surface along the entire length of the assembly for resisting windlift.

5. The assembly as defined in claim 4 wherein the openings in said secondary yokes are substantially complementary in configuration to the periphery of said extensions, whereby said secondary yokes can freely pivot to said extreme positions.

6. The assembly as defined in claim 5 wherein said openings in said secondary yokes are formed between a pair of spaced longitudinally extending in walls; said walls having aligned transversely extending bores formed therein and ramp surfaces above the bores inclined upwardly and away from the bores; said pivotal connecting means comprising a pair of oppositely extending studs formed on each of the free ends of the primary yoke and received respectively in said bores; said ramp surfaces guiding said studs into said bores when the secondary yokes are mounted in the primary yoke.

7. The assembly as defined in claim 1 wherein said primary yoke has a centrally located peripherally bounded opening formed therein between at least two spaced parallel and longitudinally extending walls; said walls having aligned transverse bores formed therein; and clip means for securing a wiper arm to said primary yoke; said clip including means for attaching the clip to a wiper arm and a pair of oppositely extending pins formed thereon received in said transverse bores, thereby to pivotally connect the clip and arm to said primary yoke.

8. The assembly as defined in claim 7 wherein said walls have ramp surfaces formed therein above the bores inclined upwardly and away from the bores; said ramp surfaces serving to guide said pins into said bores when the clip is mounted on the primary yoke.

9. The assembly as defined in claim 7 wherein said clip is formed of a resilient plastic material and includes a pair of spaced resilient walls, said pins being mounted on said resilient walls, whereby said resilient walls bias said pins into said bores.

10. The assembly as defined in claim 1 wherein said secondary yokes each have an opening formed therein between said inner and outer end portions; said free ends of said primary yoke being inserted in said openings and including means for pivotally connecting the ends of the primary yoke in the openings of the secondary yokes, said free ends of said primary yoke comprising downwardly inclined extensions of the primary yoke having a smooth upper surface forming a substantially continuous curved extension of the apex of the primary yoke; the inclination of said extension being selected such that said smooth upper surface is substantially in longitudinal alignment with the apex of the portion of the secondary yokes which extend beyond the primary yoke when the secondary yokes are moved to an extreme position with respect to the primary yoke, whereby the assembly has a substantially continuously curved profile configuration, whereby the inclined surfaces of the primary yoke are substantially aligned with at least those portions of the inclined surfaces of the secondary yokes which extend beyond the primary yoke to provide a substantially continuous inclined pressure surface along the entire length of the assembly for resisting windlift.

11. The assembly as defined in claim 1 wherein said secondary yokes each have an opening formed therein between said inner and outer end portions; said free ends of said primary yoke being inserted in said openings and including means for pivotally connecting the ends of the primary yoke in the openings of the secondary yokes; said openings being substantially complementary in configuration to the periphery of said extensions, whereby said extensions are substantially completely received in the openings and the inclined surfaces of the primary yoke are thereby positioned substantially in alignment with at least those portions of the inclined surfaces of the secondary yokes which extend beyond the primary yoke to provide a substantially continuous inclined pressure surface along the entire length of the assembly for resisting windlift.

12. The assembly as defined in claim 1 wherein said secondary yokes each have an opening formed therein between said inner and outer end portions; said free ends of said primary yoke being inserted in said openings and including means for pivotally connecting the ends of the primary yoke in the openings of the secondary yokes; said openings in said secondary yokes being formed between a pair of spaced longitudinally extending in walls; said walls having aligned transversely extending bores formed therein and ramp surfaces above the bores inclined upwardly and away from the bores; said pivotal connecting means comprising a pair of oppositely extending studs formed on each of the free ends of the primary yoke and received respectively in said bores; said ramp surfaces guiding said studs into said bores when the secondary yokes are mounted on the primary yoke.

13. The assembly as defined in claim 1 wherein said backing element comprises an elongated body having a greater width than depth and to which said squeegee is secured, said body having a pair of opposed end portions and edge portions which are located beyond the squeegee to be embraced by said claws; the edge portions of said body, adjacent said end portions having embossments formed therein providing downwardly curved surfaces along said edge portions; said embossments being located outwardly of said superstructure in said assembly thereby to provide stops for said engaging means to limit longitudinal movement of the backing member and squeegee with respect to said superstructure.

14. The assembly as defined in claim 13 wherein said engaging means comprise pairs of opposed cooperating claws formed on said secondary yokes, said claws having inclined surfaces formed thereon facing and being generally complementary to said downwardly curved surfaces whereby a broad stop area for engagement therebetween is provided to avoid overstressing of the backing material.

15. The assembly as defined in claim 14 wherein said backing element includes an additional stop member formed thereon on the side opposite said squeegee.

16. The assembly as defined in claim 14 wherein said backing element has a notch formed in at least one of said edge portions permitting disengagement of the backing element from a pair of said claws upon registration of the claws with the notch on flexing of the assembly beyond its normal extent.

* * * * *

UNITED STATES PATENT AND TRADEMARK OFFICE
CERTIFICATE OF CORRECTION

PATENT NO. : 3,942,212
DATED : March 9, 1976
INVENTOR(S) : Werner Thomas Steger, Brian Glynn, Donald Earl Emmons It is certified that error appears in the above-identified patent and that said Letters Patent are hereby corrected as shown below:

Page 1, in the heading, between Section 76 and 22, insert

--[73] Assignee: Tridon Limited, Box 5029, Burlington, Ontario, Canada--.

Signed and Sealed this

Thirteenth Day of July 1976

[SEAL]

Attest:

RUTH C. MASON
*Attesting Officer*

C. MARSHALL DANN
*Commissioner of Patents and Trademarks*